(12) United States Patent
Kramer et al.

(10) Patent No.: US 9,340,701 B2
(45) Date of Patent: May 17, 2016

(54) CURING AGENT FOR EPOXY RESIN COATINGS

(71) Applicant: SIKA TECHNOLOGY AG, Baar (CH)

(72) Inventors: Andreas Kramer, Zürich (CH); Urs Burckhardt, Zürich (CH); Ursula Stadelmann, Zürich (CH); Edis Kasemi, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 1 day.

(21) Appl. No.: 14/353,932

(22) PCT Filed: Nov. 8, 2012

(86) PCT No.: PCT/EP2012/072192
§ 371 (c)(1),
(2) Date: Apr. 24, 2014

(87) PCT Pub. No.: WO2013/068501
PCT Pub. Date: May 16, 2013

(65) Prior Publication Data
US 2014/0309334 A1    Oct. 16, 2014

(30) Foreign Application Priority Data

Nov. 10, 2011    (EP) .................................... 11188692

(51) Int. Cl.
| | | |
|---|---|---|
| *C08G 59/46* | (2006.01) | |
| *C08G 59/50* | (2006.01) | |
| *C08G 73/04* | (2006.01) | |
| *C08L 63/00* | (2006.01) | |
| *C08L 63/02* | (2006.01) | |
| *C09D 163/00* | (2006.01) | |
| *C08G 59/56* | (2006.01) | |
| *C08G 73/02* | (2006.01) | |
| *C08L 79/02* | (2006.01) | |

(52) U.S. Cl.
CPC .............. *C09D 163/00* (2013.01); *C08G 59/50* (2013.01); *C08G 59/502* (2013.01); *C08G 59/504* (2013.01); *C08G 59/5006* (2013.01); *C08G 59/5013* (2013.01); *C08G 59/5026* (2013.01); *C08G 59/5033* (2013.01); *C08G 59/5066* (2013.01); *C08G 59/56* (2013.01); *C08G 73/0206* (2013.01); *C08G 73/0213* (2013.01); *C08L 63/00* (2013.01); *C08L 79/02* (2013.01)

(58) Field of Classification Search
None
See application file for complete search history.

(56) References Cited

U.S. PATENT DOCUMENTS

| | | | | |
|---|---|---|---|---|
| 3,262,791 | A | * | 7/1966 | Dickson et al. ............ 106/14.16 |
| 3,795,659 | A | | 3/1974 | Renwick |
| 4,199,417 | A | * | 4/1980 | Borruso ........................ 205/239 |
| 6,077,886 | A | | 6/2000 | Hayes et al. |
| 2007/0232833 | A1 | | 10/2007 | Haese et al. |

FOREIGN PATENT DOCUMENTS

| | | | |
|---|---|---|---|
| EP | 1 314 748 A2 | | 5/2003 |
| GB | 918050 A | * | 2/1963 |
| GB | 1 347 981 | | 2/1974 |
| JP | 53-134871 A | * | 11/1978 |

OTHER PUBLICATIONS

International Search Report issued in International Application No. PCT/EP2012/072192 mailed Feb. 8, 2013.

* cited by examiner

*Primary Examiner* — Robert Sellers
(74) *Attorney, Agent, or Firm* — Oliff PLC

(57) ABSTRACT

The present invention relates to curing agents for epoxy resins including an alkylated polyethyleneimine. These curing agents have high functionality and a high content of secondary amino groups. Together with epoxy resins, they cure surprisingly quickly and without blushing effects even under humid and cold conditions to form films having very high cross-linking density. They are suited for coatings with high resistance requirements.

11 Claims, No Drawings

CURING AGENT FOR EPOXY RESIN COATINGS

TECHNICAL FIELD

The invention relates to the field of amines as curing agents for epoxy resins, to amine-containing epoxy resin compositions, and to the use thereof, in particular as coatings.

PRIOR ART

Epoxy resin compositions should exhibit a number of properties so as to be usable as high-quality coatings. On the one hand, they should have low viscosity, so that they are easy to process and self-spreading at the ambient temperature, and they should cure quickly without what are known as blushing effects, even under humid and cold conditions. Blushing refers to defects that occur during curing, such as cloudiness, spots, and a rough or sticky surface, resulting from the formation of salts of amines with carbon dioxide ($CO_2$) from the air, the development of blushing effects being favored by high humidity in the air and low temperatures. In the cured state, the epoxy resin coating should have an even surface without cloudiness, spots or craters, and it should have high hardness and good resistance. There is a need for curing agents having high functionalities for applications requiring very high resistance, such as in corrosion protection, so as to obtain highly cross-linked coatings.

Curing agents having high functionalities that are known from the prior art include polyalkyleneamines such as TETA, TEPA or PEHA. When unmodified, however, they have a strong tendency toward blushing effects, and in the form of adducts, their viscosity levels are very high, and while their tendency toward blushing is less, it nonetheless still exists.

In addition, there are so-called polyethyleneimines. These are branched polymers of ethyleneimine, which comprise primary, secondary and tertiary amino groups and are used primarily for water treatment and in the paper industry.

U.S. Pat. No. 6,077,886 describes epoxy resin compositions comprising a polyethyleneimine and a further amine, wherein these compositions have high creep resistance after being mixed. These compositions cannot be used for planar applications due to the high creep resistance and blushing effects.

DESCRIPTION OF THE INVENTION

Thus, it is the object of the present invention to provide a curing agent for epoxy resins which has high functionality and is liquid and not too highly viscous at room temperature and which, together with epoxy resins, can cure quickly and without blushing effects to form coatings having high hardness and resistance.

Surprisingly, it was found that curing agents according to claim 1, comprising at least one amine with the formula (I), achieve this object. The curing agents according to claim 1 are low-odor, very compatible with epoxy resins, and cure quickly even under humid and cold conditions, wherein films are created which are not tacky, have high gloss, are free from cloudiness and surface problems, and have very high cross-linking density and resistance. Particularly surprising is the fact that the amines with the formula (I) exhibit excellent reactivity under humid and cold conditions even when they do not carry any primary amine groups. The curing agents according to claim 1 can be produced using a simple method.

Further aspects of the invention are the subject matter of further independent claims. Particularly preferred embodiments of the invention are the subject matter of the dependent claims.

Ways to Implement the Invention

The invention relates to a curing agent, which is suitable for curing epoxy resins and comprises at least one amine with the formula (I),

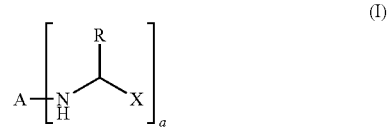

where

A is the group of a polyethyleneimine having a relative molar mass in the range of 300 to 5000 g/mol, preferably 300 to 2000 g/mol, and particularly preferably 300 to 1000 g/mol, following the removal of a primary aliphatic amino groups;

R is a hydrogen atom or an alkyl group having 1 to 12 carbon atoms, preferably a hydrogen atom or a methyl group, in particular a hydrogen atom;

a denotes an integer from 1 to 50, preferably 1 to 20, particularly preferably 1 to 10, and particularly 3 to 10; and X is a hydrocarbon group having 1 to 20 carbon atoms, which may optionally include hydroxyl groups, mercapto groups, ether groups, ester groups, pyridino groups or amino groups.

Substance names beginning with "poly", such as polyamine, polyol or polyepoxide denote substances that formally comprise two or more of the functional groups occurring in their names per molecule. The term "aliphatic" denotes an amine, the amino group of which is bound to an aliphatic, cycloaliphatic or arylaliphatic group; this group is accordingly referred to as aliphatic amino group. The term "aromatic" denotes an amine, the amino group of which is bound to an aromatic group; this group is accordingly referred to as aromatic amino group. The term "amine hydrogen" refers to the hydrogen atoms of primary and secondary amino groups. A "non-incorporatable diluent" refers to a substance which is soluble in an epoxy resin and lowers the viscosity thereof and which is non-covalently incorporated into the resin matrix during the curing of the epoxy resin. The term "viscosity" in the present document denotes the dynamic viscosity or shear viscosity, which is defined by the ratio between the shear stress and the shear rate (velocity gradient) and is determined as described in DIN EN ISO 3219.

The amine with the formula (I) is preferably free from primary amino groups. Such amines with the formula (I) cure together with epoxy resins even at low temperatures and high humidity, without undesirable blushing effects.

X preferably is an aryl group having 6 to 12 carbon atoms, in particular a group selected from the group consisting of phenyl, methylphenyl, dimethylphenyl, trimethylphenyl, ethylphenyl, isopropylphenyl and naphthyl. These amines have particularly low viscosities and, additionally, are in particular very compatible with epoxy resins, whereby the films cured therewith have a particularly high quality.

Moreover, X is preferably a hydroxyl-substituted aryl group having 6 to 12 carbon atoms, in particular a group selected from the group consisting of 2-hydroxyphenyl, 3-hydroxyphenyl and 4-hydroxyphenyl. These amines exhibit particularly rapid curing when used together with epoxy resins, in particular at low temperatures. 2-hydroxyphenyl is particularly preferred due to the lower viscosity thereof.

Moreover, X preferably is an amino-substituted aryl group having 6 to 12 carbon atoms, in particular a group selected from the group consisting of 2-aminophenyl, 3-aminophenyl and 4-aminophenyl. These amines exhibit particularly high functionality with respect to epoxy resins and are particularly hydrophobic.

Moreover, X preferably is a dialkylamino-substituted aryl group having 6 to 12 carbon atoms, in particular a group selected from the group consisting of 2-dimethylaminophenyl, 3-dimethylaminophenyl and 4-dimethylaminophenyl. These amines exhibit particularly rapid curing when used together with epoxy resins.

Moreover, X preferably is a heteroaryl group having 5 to 12 carbon atoms, in particular a group selected from the group consisting of 2-pyridinyl, 3-pyridinyl and 4-pyridinyl. These amines exhibit particularly rapid curing when used together with epoxy resins, in particular at low temperatures.

Moreover, X preferably is an alkyl or cycloalkyl group having 1 to 12 carbon atoms, in particular a group selected from the group consisting of methyl, ethyl, 1-propyl, 2-propyl, 1-butyl, 2-butyl, isobutyl, 2-pentyl, 3-pentyl, 3-heptyl, 1-undecyl and cyclohexyl. These amines have particularly low viscosities.

Moreover, X is preferably a group with the formula (II),

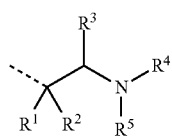

(II)

where
$R^1$ and $R^2$ either
 independently of one another each denote a monovalent hydrocarbon group having 1 to 12 carbon atoms,
 or together denote a bivalent hydrocarbon group having 4 to 12 carbon atoms, which is part of an, optionally substituted, carbocyclic ring having 5 to 8, preferably 6, carbon atoms;
$R^3$ is hydrogen or an alkyl group or an arylalkyl group or an alkoxycarbonyl group having 1 to 12 carbon atoms, preferably a hydrogen atom; and either
 $R^4$ denotes a monovalent aliphatic, cycloaliphatic or arylaliphatic group having 1 to 16 carbon atoms, which optionally comprises heteroatoms; and
 $R^5$ denotes hydrogen or a monovalent aliphatic, cycloaliphatic or arylaliphatic group having 1 to 16 carbon atoms, which optionally comprises heteroatoms;
or
 $R^4$ and $R^5$ together denote a bivalent aliphatic group having 3 to 16 carbon atoms, which is part of an, optionally substituted, heterocyclic ring having 5 to 8, preferably 6, ring atoms, wherein this ring optionally comprises further heteroatoms, in addition to the nitrogen atom.

$R^1$ and $R^2$ preferably each denote a methyl group.

$R^4$ and $R^5$ preferably form an, optionally substituted, morpholine ring with inclusion of the nitrogen atom.

Moreover, $R^4$ is preferably methyl, ethyl, propyl, isopropyl, butyl, 2-ethylhexyl, cyclohexyl, 2-hydroxyethyl, 2-methoxyethyl, 2-hydroxypropyl or benzyl; and $R^5$ is preferably a hydrogen atom or methyl, ethyl, propyl, isopropyl, butyl, 2-ethylhexyl, cyclohexyl, 2-hydroxyethyl, 2-methoxyethyl, 2-hydroxypropyl or benzyl. These amines are very compatible with epoxy resins, in particular if they include morpholine groups.

Moreover, X is preferably a group with the formula (III),

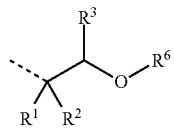

(III)

where
$R^1$, $R^2$ and $R^3$ have the meanings described in formula (II), and
$R^6$ is hydrogen or an alkyl group or acyl group having 1 to 20 carbon atoms, in particular hydrogen or an acyl group having 1 to 12 carbon atoms, particularly preferably hydrogen or dodecanoyl. If $R^6$ is dodecanoyl, amines having particularly low viscosity are accessible.

X particularly preferably is a group selected from the group consisting of phenyl, 2-hydroxyphenyl, 3-aminophenyl, 4-dimethylaminophenyl, 2-pyridinyl, 3-pyridinyl, methyl, ethyl, 2-propyl, 3-heptyl, 1-undecyl, 2,2-dimethyl-3-(N-morpholino)propyl, 2,2-dimethyl-3-hydroxypropyl and 2,2-dimethyl-3-lauroyloxypropyl, phenyl being most preferable.

If the group X is phenyl, methyl, ethyl, 2-propyl, 3-heptyl, 1-undecyl and 2,2-dimethyl-3-lauroyloxypropyl, the amine with the formula (I) has particularly low viscosity, and if the group X is phenyl, additionally particularly good compatibility exists with epoxy resins.

Moreover, X particularly preferably is a combination of different groups described as being preferred, in particular a combination of phenyl and at least one further group described as being preferred. The ratio between phenyl and the sum of the further groups described as being preferred preferably has a value of 1 to 20, and in particular of 2 to 10.

X is preferably a combination of phenyl with one or more groups selected from the group consisting of 2-hydroxyphenyl, 3-aminophenyl, 4-dimethylaminophenyl, 2-pyridinyl, 3-pyridinyl, 2,2-dimethyl-3-(N-morpholino)propyl and 2,2-dimethyl-3-lauroyloxypropyl. Such combinations can be used to influence and optimize properties such as viscosity, compatibility and curing speed of the curing agent with epoxy resins.

The amine with the formula (I) preferably has a viscosity, measured at 20° C., in the range of 150 to 50,000 mPa·s, particularly preferably in the range of 150 to 30,000 mPa·s, and particularly in the range of 150 to 20,000 mPa·s.

The present invention further relates to a method for producing a curing agent as described above, wherein the amine with the formula (I) is obtained by way of reductive alkylation of a polyethyleneimine with a carbonyl compound with the formula (IV) or (IV').

(IV)

(IV')

In formulas (IV) and (IV'), R and X have the aforementioned meanings, and X' is a nitro-substituted aryl group having 6 to 12 carbon atoms.

Aldehydes or ketones are suitable for use as the carbonyl compound with the formula (IV) or (IV'), in particular benzaldehyde, the isomeric tolualdehydes, the isomeric dimethylbenzaldehydes, the isomeric trimethylbenzaldehydes, the isomeric ethylbenzaldehydes, the isomeric isopropylbenzaldehydes, the isomeric naphthaldehydes, acetophenone, 4'-methylacetophenone, propiophenone and 4'-methylpropiophenone;

salicylaldehyde, 3-hydroxybenzaldehyde, 4-hydroxybenzaldehyde, 2'-hydroxyacetophenone, 3'-hydroxyacetophenone and 4'-hydroxyacetophenone;

2-nitrobenzaldehyde, 3-nitrobenzaldehyde, 4-nitrobenzaldehyde, 2'-nitroacetophenone, 3'-nitroacetophenone and 4'-nitroacetophenone;

2-dimethylaminobenzaldehyde, 3-dimethylaminobenzaldehyde, 4-dimethylaminobenzaldehyde and 4'-dimethylaminoacetophenone;

2-pyridinecarbaldehyde, 3-pyridinecarbaldehyde, 4-pyridinecarbaldehyde, 2-acetylpyridine, 3-acetylpyridine and 4-acetylpyridine;

butanal, isobutanal, pentanal, 2-methylbutanal, 3-methylbutanal, 2-methylpentanal, 2-ethylbutanal, 2-ethylhexanal, dodecanal, cyclohexanal, acetone, methyl ethyl ketone, methyl isopropyl ketone, methyl isobutyl ketone and 3-methylpentane-2-one;

2,2-dimethyl-3-(N-morpholino)propanal, 2,2-dimethyl-3-(N-(2,6-dimethyl)morpholino)propanal, 2,2-dimethyl-3-methylaminopropanal, 2,2-dimethyl-3-dimethylaminopropanal, 2,2-dimethyl-3-bis(2-methoxyethyl)aminopropanal, 2,2-dimethyl-3-benzylaminopropanal and 2,2-dimethyl-3-(N-benzylmethylamino)propanal;

2,2-dimethyl-3-hydroxypropanal, 2,2-dimethyl-3-methoxypropanal, 2,2-dimethyl-3-ethoxypropanal, 2,2-dimethyl-3-propoxypropanal, 3-acetoxy-2,2-dimethylpropanal, 2,2-dimethyl-3-lauroyloxypropanal and 3-benzoyloxy-2,2-dimethylpropanal.

Benzaldehyde, salicylaldehyde, 3-nitrobenzaldehyde, 4-dimethylaminobenzaldehyde, 2-pyridinecarbaldehyde, 3-Pyridinecarbaldehyde, 2,2-dimethyl-3-(N-morpholino)propanal, 2,2-dimethyl-3-hydroxypropanal and 2,2-dimethyl-3-lauroyloxypropanal are particularly preferred as the carbonyl compound with the formula (IV) or (IV').

Moreover, an amine with the formula (I) is preferably obtained by way of reductive alkylation of a polyethyleneimine with a mixture comprising multiple carbonyl compounds with the formula (IV) and/or (IV'), in particular with mixtures comprising benzaldehyde.

During the reductive alkylation, the carbonyl compound with the formula (IV) or (IV'), or the mixture comprising multiple carbonyl compounds with the formula (IV) or (IV'), is used preferably stoichiometrically relative to the primary amino groups of the polyethyleneimine, wherein amines with the formula (I) are obtained, which are free from primary amino groups.

The reductive alkylation is suitably carried out in the presence of hydrogen and under increased pressure. It can be carried out directly using molecular hydrogen, or indirectly by way of hydrogen transfer from other reagents. The use of molecular hydrogen is preferred. In the process, primary aliphatic amino groups are reductively alkylated. Optionally present nitrophenyl groups are likewise reduced or hydrogenated, wherein primary aromatic amino groups are created. The conditions are advantageously selected so that, on the one hand, the primary aliphatic amino groups and optionally present nitrophenyl groups are reacted as fully as possible and, on the other hand, preferably no other constituents of the amine and of the carbonyl compound are hydrogenated or decomposed. The process is preferably carried out at a hydrogen pressure of 5 to 100 bar and a temperature of 40 to 120° C. and in the presence of a suitable catalyst. Preferred catalysts are palladium on carbon (Pd/C), platinum on carbon (Pt/C), Adams' catalyst and Raney nickel, in particular palladium on carbon and platinum on carbon. Optionally present pyridinyl groups are not hydrogenated under the above-mentioned conditions.

Suitable polyethyleneimines for reductive alkylation for obtaining amines with the formula (I) are products from the polymerization of ethyleneimine, wherein branched polymeric structures comprising primary, secondary and tertiary amino groups are created, as shown below by way of example based on a single molecule. These are mixtures of different molecules having relative molar mass distributions as they are typically created during polymerizations.

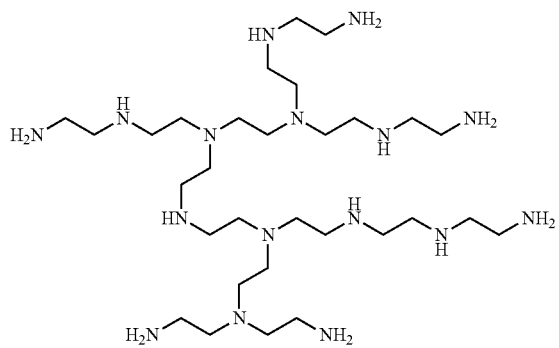 [SMILES: NCCNCCNCCN(CCNCCN(CCNCCN)CCN(CCNCCN)CCNCCN)CCN(CCN)CCN]

Suitable polyethyleneimines can be produced using known processes, or they are commercially available, in particular in the form of Lupasol® FG and Lupasol® G 20, anhydrous, (from BASF) as well as in the form of Epomin® SP-003, Epomin® SP-006, Epomin® SP-012 and Epomin® SP-018 (from Nippon Shokubai).

Producing the amine with the formula (I) by way of reductive alkylation as described is particularly advantageous for the use as a curing agent for epoxy resins, since primary amino groups are alkylated very selectively, while secondary amino groups are basically not alkylated further. The products from the described production are free from primary amino groups with stoichiometric use of the carbonyl compound with the formula (IV) or (IV') and have a high content of secondary amino groups. As a result, they can be used for curing epoxy resins in the manner described without further processing.

Amines with the formula (I) can also be obtained in manners other than by way of reductive alkylation, in particular by reacting polyethyleneimines with appropriate chlorides or bromides in a suitable ratio. However, this results in reaction mixtures, which typically have a considerable content of doubly alkylated amino groups.

The invention further relates to the use of the described curing agent for curing at least one epoxy resin. For this purpose, the curing agent is mixed with the epoxy resin in a suitable manner.

The described curing agent has particularly advantageous properties. At room temperature, it is liquid and has moderate viscosity, is low-volatile and low-odor, and has such low reactivity with respect to $CO_2$ that—contrary to many curing agents that are known from the prior art—it does not tend toward precipitations or viscosity increases, nor does it tend to form crusts, when exposed to air. The functionality thereof with respect to epoxide groups is high, even if the amine with the formula (I) does not include any primary amino groups, whereby very high cross-linking density is achieved. The curing agent is very compatible and easy to process with the customary commercial epoxy resins and cures surprisingly quickly at the ambient temperature without any undesirable blushing effects, forming cured compositions that have high hardness and very high resistance.

In addition to the amine with the formula (I), the described curing agent can comprise further compounds that are suitable for curing epoxy resins, in particular the following:

monoamines, such as in particular benzylamine, cyclohexylamine, 2-phenylethylamine, 2-methoxyphenylethylamine, 4-methoxyphenylethylamine, 3,4-dimethoxyphenylethylamine (homoveratrylamine), methylamine, ethylamine, propylamine, isopropylamine, 1- and 2-butylamine, isobutylamine, tert.-butylamine, 3-methyl-2-butylamine, 1-hexylamine, 1-octylamine, 2-ethyl-1-hexylamine, 2-methoxy-1-ethylamine, 2-ethoxy-1-ethylamine, 3-methoxy-1-propylamine, 3-ethoxy-1-propylamine, 3-(2-ethylhexyloxy)propylamine, 3-(2-methoxyethoxy) propylamine;

secondary aliphatic polyamines, such as in particular N,N'-dibutyl-ethylenediamine, N,N'-di-tert.butyl-ethylenediamine, N,N'-diethyl-1,6-hexanediamine, 1-(1-methylethyl-amino)-3-(1-methylethyl-aminomethyl)-3,5,5-trimethylcyclohexane (Jefflink® 754 from Huntsman), $N^4$-cyclohexyl-2-methyl-$N^2$-(2-methylpropyl)-2,4-pentanediamine, N,N'-dialkyl-1,3-bis-(aminomethyl) benzene, in particular N,N'-dibenzyl-1,3-bis-(aminomethyl)benzene, bis-(4-(N-3-butylamino)-cyclohexyl) methane (Clearlink® 1000 from UOP), dialkylated DETA or TETA or TEPA or PEHA or N3- or N4-amine, in particular the dibenzylated types, which optionally comprise phenol groups, moreover styrenated polyamines such as styrenated 1,3-bis-(aminomethyl) benzene, commercially available as Gaskamine® 240 (from Mitsubishi Gas Chemical), N-alkylated polyetheramines, such as Jeffamine® types SD-231, SD-401, ST-404 and SD-2001 (from Huntsman), as well as products from Michael-like addition reactions of primary aliphatic polyamines with Michael acceptors such as maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic acid aryl esters, vinyl sulfones, vinyl nitriles, nitroalkylenes or Knoevenagle condensation products, such as those made from malonic acid diesters and aldehydes, such as formaldehyde, acetaldehye or benzaldehye;

polyamines comprising primary and secondary amino groups, such as in particular N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethyl-piperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamine, and products from the Michael-like addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted at a molar ratio of 1:1, polyamines comprising primary and tertiary amino groups, such as in particular 3-(dimethylamino)-1-propylamine;

aliphatic, cycloaliphatic or arylaliphatic primary diamines, such as in particular ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)methane, bis-(4-amino-3-methylcyclohexyl) methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4), 8(9)-bis-(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]undecane and 1,3- and 1,4-bis-(aminomethyl)benzene;

aliphatic, cycloaliphatic or arylaliphatic primary triamines such as 4-aminomethyl-1,8-octanediamine, 1,3,5-tris-(aminomethyl)benzene and 1,3,5-tris-(aminomethyl) cyclohexane;

ether group-containing aliphatic primary diamines, such as in particular bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl)polytetrahydrofuranes and other polytetrahydrofurane diamines, as well as polyoxyalkylene diamines. The latter typically are products from the amination of polyoxyalkylene diols and are available, for example, by the name of Jeffamine® (from Huntsman), by the name of polyetheramine (from BASF) or by the name of PC Amine® (from Nitroil). Particularly suitable polyoxyalkylene diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;

primary polyoxyalkylene triamines, which are typically products from the amination of polyoxyalkylene triols and are available, for example, by the name of Jeffamine® (from Huntsman), by the name of polyetheramine (from BASF) or by the name of PC Amine® (from Nitroil), such as in particular Jeffamine® T-403, Jeffamine® T-3000, Jeffamine® T-5000, Polyetheramine T 403, Polyetheramine T 5000 and PC Amine® TA 403;

tertiary amino group-containing polyamines having two primary aliphatic amino groups, such as in particular N,N'-bis-(aminopropyl)piperazine, N,N-bis-(3-aminopropyl)methylamine, N,N-bis-(3-aminopropyl)ethylamine, N,N-bis-(3-aminopropyl)propylamine, N,N-bis-(3-aminopropyl)cyclohexylamine, N,N-bis-(3-aminopropyl)-2-ethyl-hexylamine, as well as products from the double cyanoethylation and subsequent reduction of fatty amines, which are derived from natural fatty acids, such as N,N-bis-(3-aminopropyl)dodecylamine and N,N-bis-(3-aminopropyl)tallow alkylamine, available as Triameen® Y12D and Triameen® YT (from Akzo Nobel);

tertiary amino group-containing polyamides having three primary aliphatic amino groups, such as in particular tris-(2-aminoethyl)amine, tris-(2-aminopropyl)amine and tris-(3-aminopropyl)amine;

secondary amino group-containing polyamines having two primary aliphatic amino groups, such as in particular 3-(2-aminoethyl)aminopropylamine, bis-hexamethylenetriamine (BHMT), diethylenetriamine (DETA), triethylenetetramine (TETA), tetraethylenepentamine (TEPA), pentaethylenehexamine (PEHA) and higher homologs of linear polyethylene amines, such as polyethylene polyamine having 5 to 7 ethyleneamine units (so-called "higher ethylenepolyamine", HEPA), products from the cyanoethylation or cyanobutylation and subsequent hydrogenation of primary di- and polyamines with at least two primary amino groups, such as dipropylenetriamine (DPTA), N-(2-aminoethyl)-1,3-propanediamine (N-3-amine), N,N'-bis(3-aminopropyl)ethylenediamine (N4-amine), N,N'-bis-(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine and N,N'-bis-(3-amino-1-ethylpropyl)-2-methyl-1,5-pentanediamine;

amino alcohols, such as in particular 3-amino-1-propanol, 2-amino-1-butanol, 6-amino-1-hexanol, aminopropyldiethanolamine (APDEA), 4-(2-aminoethyl)-2-hydroxyethylbenzene, 3-aminomethyl-3,5,5-trimethylcyclohexanol, 2-(2-aminoethoxy)-ethanol, 2-(2-(2-aminoethoxy)ethoxy)ethanol, 3-(2-hydroxyethoxy)-propylamine and 3-(2-(2-hydroxyethoxy)-ethoxy)-propylamine;

aminomercaptans, such as in particular 2-aminoethanethiol (cysteamine), 3-aminopropanethiol, 4-amino-1-butanethiol and 6-amino-1-hexanethiol;

aromatic polyamines, such as in particular m- and p-phenylenediamine, 4,4'-, 2,4'- and 2,2'-diaminodiphenylmethane, 3,3'-dichloro-4,4'-diaminodiphenylmethane (MOCA), 2,4- and 2,6-toluoylenediamine, mixtures of 3,5-dimethylthio-2,4- and -2,6-toluoylenediamine (available as Ethacure® 300 from Albemarle), mixtures of 3,5-diethyl-2,4- and -2,6-toluoylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS),4-amino-N-(4-aminophenyl)benzenesulfonamide, 5,5'-methylenedianthranilic acid, dimethyl-5,5'-methylenedianthranilate, 1,3-propylene-bis-(4-aminobenzoate), 1,4-butylene-bis-(4-aminobenzoate), polytetramethyleneoxide-bis-(4-aminobenzoate) (available as Versalink® from Air Products), 1,2-bis-(2-aminophenylthio)ethane, 2-methylpropyl-(4-chloro-3,5-diaminobenzoate) and tert.butyl-(4-chloro-3,5-diaminobenzoate);

amine/epoxide adducts, in particular adducts from the above-mentioned amines with diepoxides in a molar ratio of at least 2/1, in particular in a molar ratio of 2/1 to 6/1, or with monoepoxides in a molar ratio of at least 1/1, as well as reaction products from amines and epichlorohydrin, in particular that of 1,3-bis-(aminomethyl)benzene, commercially available as Gaskamine® 328 (from Mitsubishi Gas Chemical);

polyamidoamines, which represent reaction products of a monovalent or polyvalent carboxylic acid, or of the esters or anhydrides thereof, in particular a dimer fatty acid, and an aliphatic, cycloaliphatic or aromatic polyamine used in a stoichiometric excess, in particular a polyalkyleneamin, such as in particular DETA or TETA, in particular the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec);

Mannich bases, at times also referred to as phenalkamines, which represent reaction products of a Mannich reaction of phenols, in particular cardanol, nonylphenol or tert. butylphenol, with aldehydes, in particular formaldehyde, and polyamines, in particular the commercially available Mannich bases Cardolite® NC-541, NC-557, NC-558, NC-566, Lite 2001 and Lite 2002 (from Cardolite), Aradur® 3440, 3441, 3442 and 3460 (from Huntsman), Accelerator 2950 (from Huntsman) and Beckopox® EH 614, EH 621, EH 624, EH 628 and EH 629 (from Cytec);

liquid mercaptan-terminated polysulfide polymers, known by the trade name Thiokol® (from Morton Thiokol; for example, available from SPI Supplies, or from Toray Fine Chemicals), in particular the types LP-3, LP-33, LP-980, LP-23, LP-55, LP-56, LP-12, LP-31, LP-32 and LP-2; as well as furthermore known by the trade name Thioplast® (from Akzo Nobel), in particular the types G 10, G 112, G 131, G 1, G 12, G 21, G 22, G 44 and G 4;

mercaptan-terminated polyoxyalkylene ethers, obtainable, for example, by reacting polyoxyalkylendiols and -triols with either epichlorohydrin or with an alkyleneoxide, followed by sodium hydrogen sulfide;

mercaptan-terminated compounds in the form of polyoxyalkylene derivatives, known by the trade name Capcure® (from Cognis), in particular the types WR-8, LOF and 3-800;

polyesters of thiocarboxylic acids, such as pentaerythritol tetramercaptoacetate, trimethylolpropane trimercaptoacetate, glycol dimercaptoacetate, pentaerythritoltetra-(3-mercaptopropionate), trimethylolpropantri-(3-mercaptopropionate) and glycoldi-(3-mercaptopropionate), as well as the esterification products of polyoxyalkylene diols and triols, ethoxylated trimethylolpropane and polyester diols with thiocarboxylic acids such as thioglycolic acid and 2- or 3-mercaptopropionic acid;

further compounds comprising mercapto groups, such as in particular 2,4,6-trimercapto-1,3,5-triazine, 2,2'-(ethylenedioxy)-diethanethiol (triethyleneglycol-dimercaptan) and ethanedithiol.

Preferred among these are DAMP, MPMD, C11-neodiamine, 1,6-hexanediamine, 2,5-dimethyl-1,6-hexanediamine, TMD, 1,12-dodecanediamine, 1,4-diaminocyclohexane, bis-(4-aminocyclohexyl)methane, bis-(4-amino-3-methylcyclohexyl)methane, IPDA, 3(4),8(9)-bis-(aminomethyl)-tricyclo[5.2.1.0$^{2,6}$]decane, 1,3-bis-(aminomethyl)benzene, N,N'-dibenzyl-1,3-bis-(aminomethyl)benzene, 1,3-bis-(aminomethyl)cyclohexane, styrenated 1,3-bis-(aminomethyl)benzene, in particular Gaskamine® 240, NBDA, dibenzylated DETA, dibenzylated TETA, dibenzylated N3-amine and dibenzylated N4-amine, wherein these dibenzylated amines optionally include phenol groups, polyoxyalkylene diamines and triamines having a relative molar mass in the range of 200 to 500 g/mol, in particular the types Jeffamine® D-230, Jeffamine® D-400 and Jeffamine® T-403.

In one preferred embodiment, the curing agent comprises at least one further amine having at least two amine hydrogens that are reactive toward epoxide groups, in addition to the amine with the formula (I). Such a further amine preferably has a lower viscosity than the amine with the formula (I).

The further amine is particularly preferably selected from the group consisting of N,N'-dibenzyl-1,3-bis-(aminomethyl)benzene, styrenated 1,3-bis-(aminomethyl)benzene, in particular Gaskamine® 240, dibenzylated DETA, dibenzylated TETA, dibenzylated N3-amine, dibenzylated N4-amine and polyoxyalkylene diamine having a mean relative molar mass of approximately 240 g/mol, in particular Jeffamine® D-230. These further amines lower the viscosity of the curing agent without adding a non-incorporatable diluent to the curing agent.

Preferred are N,N'-dibenzyl-1,3-bis-(aminomethyl)benzene and Gaskamine® 240. When these are used, the curing agent exhibits particularly low viscosity and fast curing, in particular even at low temperatures, wherein coatings having very high hardness and an excellent visual quality are obtained.

The curing agent according to the invention can further comprise at least one accelerator. Substances that are suitable as accelerators are those which accelerate the reaction between amino groups and epoxide groups, in particular acids or compounds that can be hydrolyzed to form acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids, such as in particular phosphoric acid, or mixtures of the above-mentioned acids and acid esters; moreover tertiary amines, such as in particular 1,4-diazabicyclo[2.2.2]octane, benzyldimethylamine, α-methylbenzyldimethylamine, triethanolamine, dimethylaminopropylamine, imidazoles such as in particular N-methylimidazole, N-vinylimidazole or 1,2-dimethylimidazole, salts of such tertiary amines, quaternary ammonium salts, such as in particular benzyltrimethylammoniumchloride, amidines such as in particular 1,8-diazabicyclo[5.4.0]undec-7-ene, guanidines such as in particular 1,1,3,3-tetramethylguanidine, phenols, in particular bisphenols, phenolic resins and Mannich bases, such as in particular 2-(dimethylaminomethyl)phenol, 2,4,6-tris-(dimethylaminomethyl)phenol and polymers made of phenol, formaldehyde and N,N-dimethyl-1,3-propanediamine, phosphites such as in particular di- and triphenylphosphites, as well as mercapto group-containing compounds, as they were already mentioned above.

The curing agent according to the invention can further comprise at least one non-incorporatable diluent, such as in particular xylene 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butylyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, crude oil fractions such as Solvesso® types (from Exxon), alkyl phenols such as tert. butylphenol, nonylphenol, dodecylphenol and 8,11,14-pentadecatrienylphenol (Cardanol, from cashew shell oil, available, for example, as Cardolite NC-700 from Cardolite Corp., USA), styrenated phenol, bisphenols, aromatic hydrocarbon resins, in particular phenol group-containing types, adipates, sebacates, phthalates, benzoates, organic phosphoric and sulfonic acid esters and sulfonamides. Preferred are benzyl alcohol, dodecylphenol, tert. butylphenol, styrenated phenol and phenol group-containing aromatic hydrocarbon resins, in particular the Novares® types LS 500, LX 200, LA 300 and LA 700 (from Rutgers).

The curing agent preferably has no, or only a low content of, non-incorporatable diluents, particularly preferably less than 25% by weight, particularly less than 15% by weight, and most preferably less than 5% by weight. In particular, no non-incorporatable diluents are added to the curing agent.

The curing agent preferably has a viscosity, measured at 20° C., in the range of 150 to 10,000 mPa·s, particularly preferably in the range of 150 to 6000 mPa·s, and particularly in the range of 150 to 4000 mPa·s.

The invention further relates to an epoxy resin composition, comprising at least one epoxy resin and at least one curing agent as described above.

Typical technical epoxy resins are suitable as the epoxy resin. These are obtained in the known manner, for example by oxidizing the appropriate olefins or reacting epichlorohydrin with the appropriate polyols, polyphenols or amines.

So-called liquid polyepoxide resins, hereinafter referred to as "liquid resins" are particularly suitable as the epoxy resin. These have a glass transition temperature below 25° C., contrary to so-called solid resins, which have a glass transition temperature above 25° C. and can be comminuted into pourable powders at 25° C.

In one embodiment, the liquid resin is an aromatic polyepoxide. Liquid resins that are suitable for this purpose are, for example, liquid resins with the formula (V),

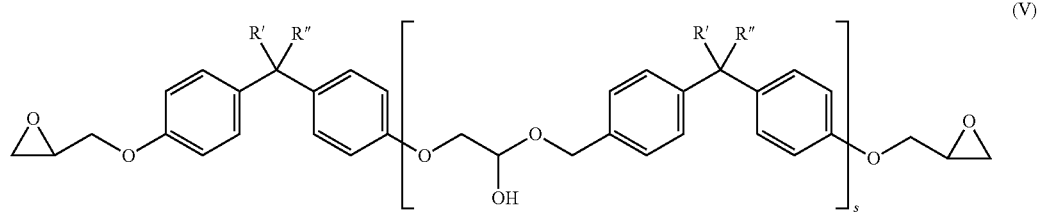

(V)

where R' and R" independently of one another each denote a hydrogen atom or a methyl group, and s on average has a value of 0 to 1. Preferred are liquid resins with the formula (V) in which the index s on average has a value of less than 0.2.

The liquid resins with the formula (V) are diglycidyl ethers of bisphenol A, bisphenol F and bisphenol NF, wherein A denotes acetone and F denotes formaldehyde, which are used as reactants for producing these bisphenols. In the base of bisphenol F, positional isomers can also be present, in particular derived from 2,4'- and 2,2'-hydroxyphenylmethane.

Further suitable aromatic liquid resins are the glycidylation products of

- dihydroxybenzene derivatives such as resorcinol, hydroquinone and catechol;
- further bisphenols or polyphenols such as bis-(4-hydroxy-3-methylphenyl)methane, 2,2-bis-(4-hydroxy-3-methylphenyl)propane (bisphenol C), bis-(3,5-dimethyl-4-hydroxyphenyl)methane, 2,2-bis-(3,5-dimethyl-4-hydroxyphenyl)propane, 2,2-bis-(3,5-dibromo-4-hydroxyphenyl)propane, 2,2-bis-(4-hydroxy-3-tert.-butylphenyl)propane, 2,2-bis-(4-hydroxyphenyl)butane (bisphenol B), 3,3-bis-(4-hydroxyphenyl)pentane, 3,4-bis-(4-hydroxyphenyl)hexane, 4,4-bis-(4-hydroxyphenyl)heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z), 1,1-bis-(4-hydroxyphenyl)-3,3,5-trimethylcyclohexane (bisphenol TMC), 1,1-bis-(4-hydroxyphenyl)-1-phenylethane, 1,4-bis[2-(4-hydroxyphenyl)-2-propyl]benzene) (bisphenol P), 1,3-bis-[2-(4-hydroxyphenyl)-2-propyl]benzene) (bisphenol M), 4,4'-dihydroxydiphenyl (DOD), 4,4'-dihydroxybenzophenone, bis-(2-hydroxynaphth-1-yl)-methane, bis-(4-hydroxynaphth-1-yl)-methane, 1,5-dihydroxy-naphthalene, tris-(4-hydroxyphenyl)methane, 1,1,2,2-tetrakis-(4-hydroxyphenyl)ethane, bis-(4-hydroxyphenyl)ether, bis-(4-hydroxyphenyl)sulfone;
- condensation products of phenols with formaldehyde which are obtained under acid conditions, such as phenol novolaks or cresol novolaks, also referred to as bisphenol F novolaks;
- aromatic amines, such as aniline, toluidine, 4-aminophenol, 4,4'-methylenediphenyldiamine, 4,4'-methylenediphenyldi-(N-methyl)amine, 4,4'-[1,4-phenylene-bis-(1-methylethylidene)]bisaniline (bisaniline P), 4,4'-[1,3-phenylene-bis-(1-methylethylidene)]-bisaniline (bisaniline M).

An aliphatic or cycloaliphatic polyepoxide is also suitable for use as the epoxy resin, such as

- a glycidyl ether of a saturated or unsaturated, branched or unbranched, cyclic or open-chain $C_2$ to $C_{30}$ diol, such as ethylene glycol, propylene glycol, butylene glycol, hexanediol, octanediol, a polypropylene glycol, dimethylolcyclohexane, neopentyl glycol or dibromoneopentyl glycol;
- a glycidyl ether of a tri- or tetrafunctional, saturated or unsaturated, branched or unbranched, cyclic or open-chain polyol, such as castor oil, trimethylolpropane, trimethylolethane, pentaerythrol, sorbitol or glycerin, as well as alkoxylated glycerin or alkoxylated trimethylpropane;
- a hydrogenated bisphenol A, F or NF liquid resin, or the glycidylation products of hydrogenated bisphenol A, F or NF;
- an N-glycidyl derivative of amides or heterocyclic nitrogen bases, such as triglycidyl cyanurate and triglycidyl isocyanurate, as well as reaction products of epichlorohydrin and hydantoin.

A bisphenol A, F or A/F solid resin, which has a similar composition as the aforementioned liquid resins with the formula (V), but in which instead the index s has a value of 2 to 12, and which has a glass transition temperature above 25° C., can also be used as the epoxy resin.

Finally, epoxy resins resulting from the oxidation of olefins, such as from the oxidation of vinylcylohexene, dicyclopentadiene, cyclohexadiene, cyclododecadiene, cyclododecatriene, isoprene, 1,5-hexadiene, butadiene, polybutadiene or divinylbenzene are also suited as the epoxy resin.

Liquid resins based on a bisphenol, in particular based on bisphenol A, bisphenol F or bisphenol A/F, as they are commercially available from Dow, Huntsman and Hexion, for example, are preferred as the epoxy resin. The viscosity of these liquid resins is low for epoxy resins, and once they're cured, they exhibit good properties as coatings. They may optionally be present in combination with bisphenol A solid resin or bisphenol F novolak epoxy resin.

The epoxy resin may include a reactive diluent, in particular a reactive diluent comprising at least one epoxide group. Suitable reactive diluents are, for example, the glycidyl ethers of mono- or polyvalent phenols and aliphatic or cycloaliphatic alcohols, such as in particular the aforementioned polyglycidyl ethers of diols or polyols, as well as furthermore in particular phenyl glycidyl ethers, cresyl glycidyl ethers, benzyl glycidyl ethers, p-n-butyl-phenyl glycidyl ethers, p-tert.butyl-phenyl glycidyl ethers, nonylphenyl glycidyl ethers, allyl glycidyl ethers, butyl glycidyl ethers, hexyl glycidyl ethers, 2-ethylhexyl glycidyl ethers, as well as glycidyl ethers of natural alcohols, such as $C_8$ to $C_{10}$ alkyl glycidyl ethers or $C_{12}$ to $C_{14}$ alkyl glycidyl ethers. The addition of a reactive diluent to the epoxy resin lowers the viscosity and—in the cured state of the epoxy resin composition—lowers the glass transition temperature and the mechanical values.

The epoxy resin composition optionally comprises further constituents, in particular auxiliary substances and additives that are customarily used in epoxy resin compositions, such as the following, for example:

solvents, diluents, film-forming auxiliary agents or extenders, such as in particular the aforementioned non-incorporatable diluents;

reactive diluents, in particular epoxide group-containing reactive diluents, as they were mentioned above, epoxidized soy bean oil or linseed oil, acetoacetate group-containing compounds, in particular acetoacetylated polyols, butyrolactone, carbonates, aldehydes, as well as furthermore isocyanates and reactive group-containing silicones;

polymers, such as polyamides, polysulfides, polyvinyl formal (PVF), polyvinyl butyral (PVB), polyurethanes (PUR), polymers comprising carboxyl groups, polyamides, butadiene-acrylonitrile copolymers, styrene-acrylonitrile copolymers, butadiene-styrene copolymers, homopolymers or copolymers of unsaturated monomers, in particular from the group consisting of ethylene, propylene, butylene, isobutylene, isoprene, vinylacetates and alkyl(meth)acrylates, in particular chlorosulfonated polyethylenes and fluorine-containing polymers, sulfonamide-modified melamines and suitable montan waxes;

inorganic or organic fillers, such as ground or precipitated calcium carbonates, which are optionally coated with fatty acids, in particular stearates, barite (heavy spar), talc, quartz powders, silica sand, iron mica, dolomites, wollastonites, kaolins, mica (potassium aluminum silicate), molecular sieves, alumina, aluminum hydroxides, magnesium hydroxide, silicic acids, cements, gypsum, flue ashes, carbon black, graphite, metal powders such as aluminum, copper, iron, zinc, silver or steel, PVC powders or hollow spheres;

fibers, in particular glass fibers, carbon fibers, metal fibers, ceramic fibers or polymer fibers such as polyamide fibers or polyethylene fibers;

pigments, in particular titanium dioxide and iron oxides;

the aforementioned accelerators;

rheology modifiers, such as in particular thickeners, for example phyllosilicates such as bentonite, derivatives of castor oil, hydrogenated castor oil, polyamides, polyurethanes, urea compounds, pyrogenic silicic acids, cellulose ethers and hydrophobically modified polyoxyethylenes;

adhesion promoters, for example organoalkoxysilanes such aminosilanes, mercaptosilanes, epoxysilanes, vinylsilanes, (meth)acrylsilanes, isocyanatosilanes, carbamatosilanes, alkylsilanes, S-(alkylcarbonyl)-mercaptosilanes and aldiminosilanes, as well as oligomeric forms of these silanes, in particular 3-glycidoxypropyltrimethoxysilane, 3-aminopropyltrimethoxysilane, N-(2-aminoethyl)-3-aminopropyl-trimethoxysilane, N-(2-aminoethyl)-N'-[3-(trimethoxysilyl)propyl]ethylenediamine, 3-mercaptopropyltrimethoxysilane, 3-isocyanatopropyltrimethoxysilane, 3-ureidopropyltrimethoxysilane, 3-chloropropyltrimethoxysilane, vinyltrimethoxysilane, of the corresponding organosilanes comprising ethoxy groups instead of the methoxy groups;

stabilizers against oxidation, heat, light and UV radiation;

flame retardants, in particular compounds such as aluminum hydroxide ($Al(OH)_3$; also referred to as ATH for "aluminum trihydrate"), magnesium hydroxide ($Mg(OH)_2$; also referred to as MDH for "magnesium dihydrate"), ammonium sulfate (($NH_4)_2SO_4$), boric acid ($B(OH)_3$), zinc borate, zinc phosphate, melamine borate and melamine cyanurate; phosphorus-containing compounds such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis- and tris-(isopropylphenyl) phosphate, resorcinol-bis(diphenyl phosphate), resorcinol diphosphate oligomer, tetraphenyl resorcinol diphosphite, ethylene diamine diphosphate and bisphenol A-bis(diphenyl phosphate); halogen-containing compounds such as chloroalkyl phosphates, in particular tris-(chloroethyl) phosphate, tris-(chloropropyl) phosphate and tris-(dichloroisopropyl) phosphate, polybromated diphenyl ethers, in particular decabromodiphenyl ether, polybromated diphenyl oxide, tris-[3-bromo-2,2-bis(bromomethyl)propyl]phosphate, tetrabromo bisphenol A, bis-(2,3-dibromopropyl ether) of bisphenol A, bromated epoxy resins, ethylene-bis(tetrabromophthalimide), ethylene-bis(dibromo-norbornane-dicarboximide), 1,2-bis-(tribromophenoxy)ethane, tris-(2,3-dibromopropyl)isocyanurate, tribromophenol, hexabromocyclododecane, bis-(hexachlorocyclopentadieno)cyclooctane and chloroparaffins; as well as combinations of a halogen-containing compound and antimony trioxide ($Sb_2O_3$) or antimony pentoxide ($Sb_2O_5$);

surfactants, in particular wetting agents, leveling agents, deaerating agents and defoaming agents;

biocides, such as algicides, fungicides or fungus growth-inhibiting substances.

The epoxy resin composition preferably comprises further auxiliary agents and additives, in particular wetting agents, leveling agents, defoaming agents, stabilizers, pigments and catalysts, in particular salicylic acid or 2,4,6-tris-(dimethylaminomethyl)phenol. The epoxy resin composition preferably has no, or only a low content of, non-incorporatable diluents, particularly preferably less than 10% by weight, particularly less than 5% by weight, and most preferably less than 2% by weight.

The ratio of the number of groups that are reactive toward epoxide groups to the number of epoxide groups in the epoxy resin composition is preferably in the range of 0.5 to 1.2, and preferably 0.7 to 12. The amine hydrogens that are present in the epoxy resin composition, and optionally present further groups that are reactive toward epoxide groups, react with the epoxide groups opening the ring thereof (addition reaction). As a result of these reactions, the composition polymerizes and finally cures. It is known to a person skilled in the art that primary amino groups are difunctional with respect to epoxide groups, and one primary amino group thus counts as two groups that are reactive toward epoxide groups.

The epoxy resin composition is in particular a two-component composition, consisting of one resin component and one curing agent component, wherein the epoxy resin is part of the resin component and the described curing agent is part of the curing agent component. Each of the components of the two-component composition are stored in a separate container. Further constituents of the two-component epoxy resin composition may be present as constituents of the resin or curing agent composition, wherein further constituents that are reactive toward epoxide groups are preferably part of the curing agent component. A suitable container for storing the resin or the curing agent component is in particular a barrel, a hobbock, a bag, a bucket, a can, a cartridge or a tube. The components are suitable for storage, which is to say they can be stored for several months, up to a year and longer, prior to use, without changing the respective properties thereof to a degree that is relevant for their use. For use of the two-component epoxy resin composition, the resin component and the curing agent component are mixed with each other just prior to or during the application. The mixing ratio between the two components is preferably selected so that the ratio of the groups of the curing agent component which are reactive toward the epoxide groups to the epoxide groups of the resin component is as described above. In parts by weight, the mixing ratio between the resin component and the curing agent component is typically in a range of 1:10 to 10:1. The two components are mixed using a suitable method; this can be carried out continuously or in batches. If the mixing is carried out prior to the application, it must be ensured that not too much time passes between the mixing of the components and the application, since this may cause disruptions, such as a slowed or incomplete development of the adhesion to the substrate. Mixing is carried out in particular at the ambient temperature, which is typically in the range of approximately 5 to 50° C., and preferably approximately 10 to 30° C. When the two components are mixed, curing starts as a result of a chemical reaction, as described above. Curing takes place in particular at the ambient temperature. It typically extends over several days to weeks until it is substantially completed under the described conditions. The duration depends, among other things, on the temperature, the reactivity of the constituents and the stoichiometry thereof, and the presence of accelerators.

The invention thus also relates to a cured composition, which is obtained from curing an epoxy resin composition as described in the present document.

The epoxy resin composition is applied to at least one substrate, wherein the following are particularly suited:

- glass, glass ceramic, concrete, mortar, brick, clay brick, gypsum and natural stones such as granite or marble;
- metal and alloys such as aluminum, iron, steel and non-ferrous metals, as well as surface-coated metals and alloys, such as zinc-plated or chromium-plated metals;
- leather, textiles, paper, wood, derived timber products bound with resins, such as phenol, melamine or epoxy resins, resin textile composite materials and further so-called polymer composites;
- polymers such as polyvinyl chloride (hard and soft PVC), acrylonitrile butadiene styrene copolymers (ABS), polycarbonate (PC), polyamide (PA), polyester, poly (methyl methacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the polymers can preferably be surface-treated by way of plasma, corona or flames;
- fiber-reinforced plastic materials, such as carbon fiber reinforced plastics (CFRP), glass fiber reinforced plastics (GFRP) and sheet molding compounds (SMC);
- coated substrates, such as powder-coated metals or alloys;
- colors and paints, in particular automobile top coats.

The substrates can be pretreated prior to the application of the epoxy resin composition, if needed. Such pretreatments include in particular physical and/or chemical cleaning methods, such as grinding, sand blasting, shot peening, brushing or the like, wherein the resulting dust that is created is advantageously suctioned off, and moreover treating with cleaning agents or solvents, or applying an adhesion promoter, an adhesion promoter solution or a primer.

The described epoxy resin composition can advantageously be used as a fiber composite, casting compound, sealant, adhesive, covering, coating, coat of paint, paint, seal, base coat or primer. The composition can be used in particular as a casting compound, sealant and adhesive, for example as an electrical potting compound, sealing compound, autobody adhesive, sandwich element adhesive, half shell adhesive, for example for rotor blades of wind turbines, bridge element adhesive and anchoring adhesive; furthermore as a covering, coating, coat of paint, paint, seal, base coat and primer for construction and industrial uses, such as in particular as a floor covering and floor coating for interior spaces such as offices, industrial halls, gyms or walk-in refrigerators, or outdoor for balconies, terraces, parking decks, bridges or roofs, as a protective coating for concrete, cement, metals, polymers or wood, such as for sealing the surfaces of wood constructions, vehicles, loading surfaces, tanks, silos, shafts, tubes, pipelines, machines or steel constructions, such as of ships, piers, offshore platforms, lock gates, hydroelectric power plants, barrage weirs, swimming pools, wind turbines, bridges, chimneys, cranes or bulkheads, wherein these coatings protect the respective substrates in particular from corrosion, abrasion, moisture, effects of water and/or salt or chemicals; and furthermore, as a prime coat, adhesive coat, anti-corrosive primer or for hydrophobing surfaces. The described composition is in particular also suited as a coating for so-called heavy-duty corrosion protection in and on the water, in particular also in and on seawater. In particular when it is used as a coating, covering or coat of paint, a further coating, a further covering, or a further coat of paint can be applied to the completely or partially cured epoxy resin composition, wherein this further layer can likewise be an epoxy resin composition, but also another material, in particular a polyurethane or polyurea coating.

The described epoxy resin composition can be used particularly advantageously as a coating. The term "coating" shall be understood to mean coverings of all types that are applied in a planar manner, in particular also coats of paint, paints, seals, base coats and primers, as described above. The described epoxy resin composition can be used advantageously in particular in coatings that are to have particularly high resistance, in particular with respect to mechanical loads, moisture, the effects of water and/or salt, fecal matter, chemicals or foods.

When it is used as a coating, the epoxy resin composition is advantageously used in a method for coating, wherein it has a liquid consistency with low viscosity and good spreading properties and can be applied, in particular, as a self-spreading coating to predominantly flat surfaces or as a coat of paint. Directly after the resin and curing agent components have been mixed, the epoxy resin composition in this application preferably has a viscosity, measured at 20° C., in the range of 300 to 4000 mPa·s, preferably in the range of 300 to 3000 mPa·s, and particularly in the range of 300 to 2000 mPa·s. The mixed composition is applied to a substrate within the processing time in a planar manner as a thin film having a layer thickness of typically approximately 50 μm to approximately 5 mm, typically at the ambient temperature The application is carried out by way of pouring onto the substrate to be coated, for example. The composition is uniformly distributed in the liquid state with the aid of a doctor blade or a notched trowel, for example. In addition, the distributed composition can be leveled and deaerated using a spiked roller. However, the application can also be carried out manually using a brush or a roller, or as a spray application, for example as an anti-corrosive coating applied to steel. During curing, typically substantially clear, glossy and non-tacky films having high hardness and good resistance are created, which exhibit good adhesion to a wide variety of substrates. The described curing agents make epoxy resins accessible which cure even under unfavorable reaction conditions, which is to say those that favor blushing, in particular at low curing temperatures in the range of 5 to 10° C. and high humidity, to form high-quality films.

The invention further relates to an article comprising a cured composition, obtained by the curing of the described epoxy resin composition. The cured composition is present in particular in the form of a coating.

The described epoxy resin composition is characterized by advantageous properties. It has only low odor and can be processed well as a planar coating. It cures at the ambient temperature and surprisingly quickly and without undesirable blushing effects, in particular also under humid and cold conditions, and it has very high hardness in the cured state, very high cross-linking density and very high resistance to a wide variety of attacks. Cured films are typically not cloudy and have an evenly glossy, non-tacky surface that is free from craters. Epoxy resin compositions that include a further amine, in addition to the amine with the formula (I), can be processed particularly easily.

EXAMPLES

Exemplary embodiments are provided hereafter, which are intended to describe the present invention in greater detail. Of course the invention is not limited to these described exemplary embodiments.

1. Description of the Measuring Methods

The amine content, which is to say the total content of amino groups in the produced compounds, was determined titrimetrically (using 0.1N $HClO_4$ in glacial acetic acid, against crystal violet) and is always indicated in mmol N/g. Infrared spectra (FT-IR) were measured as undiluted films on an FT-IR 1600 device made by Perkin-Elmer equipped with a horizontal ATR measuring unit with a ZnSe crystal; the absorption bands are indicated in wavenumbers ($cm^{-1}$) (measurement window: 4000-650 $cm^{-1}$).

The viscosity was measured on a thermostated Rheotec RC30 cone and plate viscosimeter (cone diameter 50 mm, cone angle 1°, cone tip-plate distance 0.05 mm, shear rate 10-100 $s^{-1}$).

2. Substances Used

Lupasol® FG: polyethyleneimine, mean relative molar mass approx. 800 g/mol, ratio of primary/secondary/tertiary amines approx. 1/0.9/0.6 (from BASF)

Epomin® SP-003: polyethyleneimine, mean relative molar mass approx. 300 g/mol, ratio of primary/secondary/tertiary amines approx. 45/35/20 (from Nippon Shokubai)

Epomin® SP-006: polyethyleneimine, mean relative molar mass approx. 600 g/mol, ratio of primary/secondary/tertiary amines approx. 35/35/30 (from Nippon Shokubai)

Epomin® SP-012: polyethyleneimine, mean relative molar mass approx. 1200 g/mol, ratio of primary/secondary/tertiary amines approx. 35/35/30 (from Nippon Shokubai)

DB-MXDA: N,N'-dibenzyl-1,3-bis-(aminomethyl)benzene, produced from 21.2 g benzaldehyde and 13.6 g 1,3-bis-(aminomethyl)benzene according to the general production protocol for reductive alkylation, amine content 6.41 mmol N/g Gaskamine® 240: styrenated 1,3-bis-(aminomethyl)benzene, NH equivalent=103 g/Eq, amine content 7.18 mmol N/g (from Mitsubishi Gas Chemical)

Jeffamine® D-230: polypropylene glycol diamine, mean relative molar mass approx. 240 g/mol, amine content approx. 8.29 mmol N/g (from Huntsman)

Araldite® GY 250: bisphenol A diglycidyl ether; epoxy equivalent approx. 187.5 g/Eq (from Huntsman)

Araldite® DY-E: monoglycidyl ether of a $C_{12}$ to $C_{14}$ alcohol; epoxy equivalent approx. 290 g/Eq (from Huntsman)

Ancamine® K 54: 2,4,6-tris-(dimethylaminomethyl)phenol (from Air Products)

3. Production of Curing Agents

General Production Protocol for Reductive Alkylation

An aldehyde, or a mixture of aldehydes and a polyethyleneimine, was dissolved in a nitrogen atmosphere in a round-bottomed flask in sufficient isopropanol. The solution was stirred for 30 minutes at room temperature and was then hydrogenated at a hydrogen pressure of 80 bar, a temperature of 80° C., and a flow of 3 ml/min on a continuously operating hydrogenation apparatus using a Pd/C fixed bed catalyst. To monitor the reaction, it was checked by way of IR spectroscopy whether the imine band disappeared at approx. 1665 $cm^{-1}$. Thereafter, the solution was concentrated under vacuum at 80° C.

Curing Agent H1:

In accordance with the general production protocol for reductive alkylation, 21.2 g benzaldehyde and 20.0 g Lupasol® FG were reacted. This resulted in a clear, slightly yellowish oil having a viscosity of 9300 mPa·s at 20° C. and an amine content of 10.20 mmol N/g.

FT-IR: 3022, 2808, 1494, 1449, 1119, 1026, 727, 694

Curing Agent H2:

76.2 parts by weight of the curing agent of Example 1 were mixed with 39.6 parts by weight of DB-MXDA. This resulted in a clear, slightly yellowish oil having a viscosity of 1230 mPa·s at 20° C.

Curing Agent H3:

In accordance with the general production protocol for reductive alkylation, 21.2 g benzaldehyde and 20.0 g Epomin® SP-003 were reacted. This resulted in a clear, slightly yellowish oil having a viscosity of 1300 mPa·s at 20° C. and an amine content of 11.38 mmol N/g. FT-IR: 3060, 3025, 2888, 2815, 1494, 1452, 1116, 1027, 727, 694

Curing Agent H4:

In accordance with the general production protocol for reductive alkylation, 17.7 g benzaldehyde and 20.0 g Epomin® SP-006 were reacted. This resulted in a clear, slightly yellowish oil having a viscosity of 7300 mPa·s at 20° C. and an amine content of 9.99 mmol N/g. FT-IR: 2883, 2807, 1494, 1452, 1357, 1337, 1119, 1027, 731, 696

Curing Agent H5:

In accordance with the general production protocol for reductive alkylation, 17.7 g benzaldehyde and 20.0 g Epomin® SP-012 were reacted. This resulted in a clear, slightly yellowish oil having a viscosity of 24700 mPa·s at 20° C. and an amine content of 9.69 mmol N/g. FT-IR: 2934, 2885, 2809, 1494, 1452, 1358, 1338, 1116, 1027, 732, 696

Curing Agent H6:

In accordance with the general production protocol for reductive alkylation, 29.8 g 4-(dimethylamino)benzaldehyde and 20.0 g Lupasol® FG were reacted. This resulted in a slightly cloudy, slightly yellowish oil having a viscosity of 28500 mPa·s at 20° C. and an amine content of 10.11 mmol N/g. FT-IR: 2883, 2805, 1614, 1521, 1444, 1344, 1224, 1162, 1128, 1059, 946, 804

Curing Agent H7:

In accordance with the general production protocol for reductive alkylation, 24.9 g 4-(dimethylamino)benzaldehyde and 20.0 g Epomin® SP-006 were reacted. This resulted in a slightly cloudy, slightly yellowish oil having a viscosity of 31600 mPa·s at 20° C. and an amine content of 10.36 mmol N/g. FT-IR: 2884, 2806, 1614, 1521, 1444, 1344, 1225, 1163, 1128, 1059, 946, 804

Curing Agent H8:
In accordance with the general production protocol for reductive alkylation, 24.4 g salicyaldehyde and 20.0 g Lupasol® FG were reacted. This resulted in a clear, yellow, highly viscous oil having a viscosity of 38300 mPa·s at 60° C. and an amine content of 11.69 mmol N/g. FT-IR: 2929, 2816, 1589, 1454, 1254, 1102, 1035, 750

Curing Agent H9:
In accordance with the general production protocol for reductive alkylation, a mixture comprising 19.1 g benzaldehyde and 2.4 g salicylaldehyde was reacted with 20.0 g Lupasol® FG. This resulted in a clear, yellowish oil having a viscosity of 13700 mPa·s at 20° C. and an amine content of 9.93 mmol N/g. FT-IR: 2808, 1494, 1451, 1254, 1026, 729, 695

Curing Agent H10:
In accordance with the general production protocol for reductive alkylation, a mixture comprising 19.1 g benzaldehyde and 2.1 g 2-pyridinecarbaldehyde was reacted with 20.0 g Lupasol® FG. This resulted in a clear, slightly yellowish oil having a viscosity of 9500 mPa·s at 20° C. and an amine content of 10.78 mmol N/g. FT-IR: 3025, 2931, 2884, 2808, 1494, 1452, 1118, 1054, 1027, 731, 696

Curing Agent H11:
In accordance with the general production protocol for reductive alkylation, a mixture comprising 19.1 g benzaldehyde and 3.0 g 3-nitrobenzaldehyde was reacted with 20.0 g Lupasol® FG. This resulted in a clear, yellowish oil having a viscosity of 16100 mPa·s at 20° C. and an amine content of 10.40 mmol N/g. FT-IR: 3025, 2931, 2884, 2809, 1494, 1452, 1116, 1054, 1027, 731, 696

Curing Agent H12:
In accordance with the general production protocol for reductive alkylation, 49.8 g 2,2-dimethyl-3-lauroyloxypropanal and 20.0 g Lupasol® FG were reacted. This resulted in a clear, slightly yellowish oil having a viscosity of 1700 mPa·s at 20° C. and an amine content of 5.61 mmol N/g. FT-IR: 2950, 2887, 2847, 2801, 1455, 1116, 1101, 863, 754

Curing Agent H13:
In accordance with the general production protocol for reductive alkylation, a mixture comprising 10.6 g benzaldehyde, 4.9 g salicylaldehyde and 17.0 g 2,2-dimethyl-3-lauroyloxypropanal was reacted with 20.0 g Lupasol® FG. This resulted in a clear, yellowish oil having a viscosity of 6900 mPa·s at 20° C. and an amine content of 7.43 mmol N/g. FT-IR: 2918, 2811, 1730, 1452, 1252, 1112, 732, 696

Curing Agent H14:
In accordance with the general production protocol for reductive alkylation, 30.0 g 2,2-dimethyl-3-(N-morpholino)-propanal and 20.0 g Lupasol® FG were reacted. This resulted in a clear, slightly yellowish oil having a viscosity of 18000 mPa·s at 20° C. and an amine content of 10.61 mmol N/g. FT-IR: 3025, 2931, 2884, 2808, 1494, 1452, 1118, 1027, 731, 696

Curing Agent H15:
In accordance with the general production protocol for reductive alkylation, a mixture comprising 8.5 g benzaldehyde, 4.9 g salicylaldehyde and 10.3 g 2-ethylhexanal was reacted with 20.0 g Lupasol® FG. This resulted in a clear, yellowish oil having a viscosity of 7000 mPa·s at 20° C. and an amine content of 10.24 mmol N/g. FT-IR: 2952, 2922, 2852, 1627, 1463, 1422, 1112, 1057, 721

4. Production of Epoxy Resin Compositions

For each example, the ingredients listed in Table 1 were mixed in the indicated amounts (in parts by weight) by way of a centrifugal mixer (SpeedMixer™ DAC 150, FlackTek Inc.). 10 minutes after mixing, the viscosity of the respective compositions was determined at 20° C. ("viscosity (10')"). Moreover, in each case a first film having a layer thickness of 500 μm was applied to a glass plate and stored or cured at 23±1° C. and 50±5% relative humidity (=standard climate, hereinafter abbreviated as "SC"). After 4 weeks, the aspect ratio of the films was evaluated (denoted by "Aspect (SC)" in the tables). A film was described as "great" if it was clear and had a glossy and non-tacky surface having no structure. Any type of marking or pattern on the surface is referred as a "structure." Moreover, the Koenig hardness (pendulum hardness according to Koenig, measured according to DIN EN ISO 1522) of the films was determined after 2 days ("Koenig hardness (SC) (2 d)"), after 4 days ("Koenig hardness (SC) (4 d)"), after 7 days ("Koenig hardness (SC) (7 d)") and after 4 weeks ("Koenig hardness (SC) (4 w)"). Moreover, in each case a second film having a layer thickness of 500 μm was applied to a glass plate and stored or cured immediately after the application for 7 days at 8° C. and 80% relative humidity, and thereafter for 3 weeks under SC. Finally, the aspect ratio of these films was evaluated (denoted by "Aspect (8°/80%)" in the tables) in the same manner as described for Aspect (SC). The Koenig hardness was again determined in the films thus cured, in each case after 7 days at 8° C. and 80% relative humidity ("Koenig hardness (8° 180%) (7 d cold)"), then after 2 more days under SC ("Koenig hardness (8°/80%) (+2 d SC)"), 7 days under SC ("Koenig hardness (8°/80%) (+7 d SC)") and 3 weeks under SC ("Koenig hardness (8°/80%) (+3 w SC)"). The results are indicated in Table 1.

TABLE 1

Composition and properties of compositions Z1 to Z16.

| Composition | Z1 | Z2 | Z3 | Z4 | Z5 | Z6 | Z7 | Z8 |
|---|---|---|---|---|---|---|---|---|
| Araldite ® GY-250 | 167.2 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 | 31.8 |
| Curing agent (type, quantity) | H1, 101.7 | H2, 115.8 | H1, 76.2 | H1, 40.7 | H3, 112.0 | H4, 104.0 | H6, 61.6 | H7, 125.7 |
| DB-MXDA | — | — | — | — | — | — | 79.1 | — |
| Gaskamine ® 240 | — | — | 25.8 | — | — | — | — | — |
| Jeffamine ® D-230 | — | — | — | 36.0 | — | — | — | — |
| Ancamine ® K 54 | 6.0 | 6.3 | 6.0 | 5.5 | 6.2 | 6.1 | 6.8 | 6.5 |
| Viscosity (10') [Pa · s] | 3.04 | 1.90 | 1.78 | 0.98 | 1.58 | 3.16 | 1.48 | 6.44 |
| Koenig hardness [s] | | | | | | | | |
| (2 d) | 115 | 83 | 132 | 113 | 171 | 178 | 55 | 196 |
| (4 d) | 164 | 160 | 169 | 146 | 190 | 192 | 113 | 209 |
| (SC) (7 d) | 172 | 185 | 185 | 158 | 200 | 203 | 150 | 211 |
| (4 w) | 206 | 210 | 199 | 182 | 206 | 213 | 186 | 225 |
| Aspect ratio (SC) | great | great | great | great | great | great | great | great |

TABLE 1-continued

Composition and properties of compositions Z1 to Z16.

| Koenig h.[s] | | | | | | | | |
|---|---|---|---|---|---|---|---|---|
| (7 d cold) | 66 | 59 | 62 | 35 | 120 | 133 | 49 | 140 |
| (+2 d SC) | 153 | 144 | 144 | 59 | 171 | 185 | 112 | 195 |
| (8°/80%) (+7 d SC) | 186 | 183 | 179 | 83 | 183 | 197 | 148 | 196 |
| (+3 w SC) | 196 | 197 | 205 | 115 | 193 | 203 | 185 | 218 |
| Aspect ratio (8°/80%) | great | great | great | great | great | great | great | great |

| Composition | Z9 | Z10 | Z11 | Z12 | Z13 | Z14 | Z15 | Z16 |
|---|---|---|---|---|---|---|---|---|
| Araldite ® GY-250 | 167.2 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 | 31.8 |
| Curing agent (type, quantity) | H9, 102.8 | H9, 77.1 | H9, 51.4 | H10, 101.7 | H11, 89.9 | H13, 153.7 | H14, 134.2 | H15, 107.5 |
| DB-MXDA | — | 39.6 | 79.1 | — | — | — | — | — |
| Ancamine ® K 54 | 6.0 | 6.3 | 6.6 | 6.0 | 5.8 | 7.1 | 6.7 | 6.1 |
| Viscosity (10') [Pa · s] | 3.27 | 2.01 | 1.23 | 3.32 | 4.59 | 3.41 | 3.74 | 2.11 |
| Koenig h. [s] | | | | | | | | |
| (2 d) | 119 | 92 | 57 | 158 | 116 | 50 | 17 | 122 |
| (4 d) | 192 | 169 | 143 | 183 | 176 | 91 | 36 | 150 |
| (SC) (7 d) | 200 | 190 | 175 | 204 | 185 | 111 | 80 | 164 |
| (4 w) | 210 | 202 | 203 | 204 | 203 | 137 | 106 | 176 |
| Aspect ratio (SC) | great | great | great | great | great | great | great | great |
| Koenig h.[s] | | | | | | | | |
| (7 d cold) | 91 | 69 | 56 | 90 | nd | 39 | 11 | 76 |
| (+2 d SC) | 172 | 153 | 137 | 182 | nd | 84 | 55 | 106 |
| (8°/80%) (+7 d SC) | 202 | 190 | 179 | 189 | nd | 115 | 90 | 118 |
| (+3 w SC) | 205 | 204 | 195 | 190 | nd | 144 | 105 | 158 |
| Aspect ratio (8°/80%) | great | great | great | great | nd | great | great | matte |

"Koenig h." denotes "Koenig hardness"; "nd" denotes "not determined"

The invention claimed is:

1. A curing agent, which is suitable for curing epoxy resins and comprises at least one amine with the formula (I),

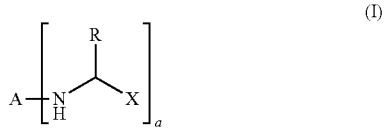

(I)

where
- A is the group of a polyethyleneimine having a relative molar mass in the range of 300 to 5000 g/mol, following the removal of a primary aliphatic amino groups;
- R is a hydrogen atom or an alkyl group having 1 to 12 carbon atoms;
- a denotes an integer from 1 to 50; and
- X is a dialkylamino-substituted aryl group having 6 to 12 carbon atoms.

2. The curing agent according to claim 1, wherein A is the group of a polyethyleneimine having a relative molar mass in the range of 300 to 2000 g/mol, following the removal of a primary aliphatic amino groups.

3. The curing agent according to claim 1, wherein R is a hydrogen atom or a methyl group.

4. The curing agent according to claim 1, wherein a denotes 1 to 20.

5. The curing agent according to claim 1, wherein the amine with the formula (I) is free from primary amino groups.

6. A curing agent comprising at least one amine with the formula (I),

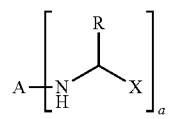

(I)

where
- A is the group of a polyethyleneimine having a relative molar mass in the range of 300 to 5000 g/mol, following the removal of a primary aliphatic amino groups;
- R is a hydrogen atom or an alkyl group having 1 to 12 carbon atoms; a denotes an integer from 1 to 50; and
- X is a hydrocarbon group having 1 to 20 carbon atoms, which may optionally include hydroxyl groups, mercapto groups, ether groups, ester groups, pyridino groups or amino groups, and
- at least one further amine having at least two amine hydrogens that are reactive toward epoxide groups.

7. A method for producing a curing agent according to claim 1, wherein the amine with the formula (I) is obtained by way of reductive alkylation of a polyethyleneimine with at least one carbonyl compound with the formula (IV) and/or (IV'),

(IV)

-continued

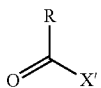
(IV')

where
R is a hydrogen atom or an alkyl group having 1 to 12 carbon atoms;
X is a dialkylamino-substituted aryl group having 6 to 12 carbon atoms; and
X' is a nitro-substituted aryl group having 6 to 12 carbon atoms.

8. A method comprising curing at least one epoxy resin with a curing agent comprising at least one amine with the formula (I),

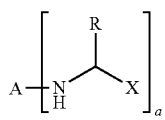
(I)

where
A is the group of a polyethyleneimine having a relative molar mass in the range of 300 to 5000 g/mol, following of a primary aliphatic amino groups;
R is a hydrogen atom or an alkyl group having 1 to 12 carbon atoms; a denotes an integer from 1 to 50; and
X is a hydrocarbon group having 1 to 20 carbon atoms, which may optionally include hydroxyl groups, mercapto groups, ether groups, ester groups, pyridino groups or amino groups.

9. An epoxy resin composition comprising at least one epoxy resin and at least one curing agent comprising at least one amine with the formula (I),

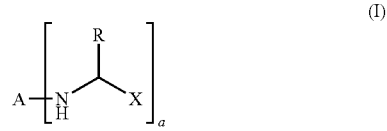
(I)

where
A is the group polyethyleneimine having a relative molar mass in the range of 300 to 5000 g/mol, following the removal of a primary aliphatic amino groups;
R is a hydrogen atom or an alkyl group having 1 to 12 carbon atoms; a denotes an integer from 1 to 50; and
X is a hydrocarbon group having 1 to 20 carbon atoms, which may optionally include hydroxyl groups, mercapto groups, ether groups, ester groups, pyridino groups or amino groups.

10. A cured composition, obtained by curing the epoxy resin composition according to claim 9.

11. An article comprising a cured composition according to claim 10.

* * * * *